(12) United States Patent
McBrearty et al.

(10) Patent No.: US 10,956,629 B2
(45) Date of Patent: Mar. 23, 2021

(54) ESTIMATION OF SOILING LOSSES FOR PHOTOVOLTAIC SYSTEMS FROM MEASURED AND MODELED INPUTS

(71) Applicant: Locus Energy, Inc., Hoboken, NJ (US)

(72) Inventors: Charles McBrearty, San Francisco, CA (US); Shawn Kerrigan, Redwood City, CA (US); Michael Herzig, Leonia, NJ (US)

(73) Assignee: LOCUS ENERGY, INC., Hoboken, NJ (US)

( * ) Notice: Subject to any disclaimer, the term of this patent is extended or adjusted under 35 U.S.C. 154(b) by 297 days.

(21) Appl. No.: 15/910,147

(22) Filed: Mar. 2, 2018

(65) Prior Publication Data

US 2018/0196901 A1 Jul. 12, 2018

Related U.S. Application Data

(63) Continuation-in-part of application No. 13/729,066, filed on Dec. 28, 2012, now abandoned.

(Continued)

(51) Int. Cl.

| | |
|---|---|
| *G06F 30/20* | (2020.01) |
| *H02S 50/00* | (2014.01) |
| *H02S 99/00* | (2014.01) |
| *H02J 3/38* | (2006.01) |
| *H02S 50/10* | (2014.01) |

(Continued)

(52) U.S. Cl.
CPC ............. *G06F 30/20* (2020.01); *G06Q 10/04* (2013.01); *H02J 3/383* (2013.01); *H02S 50/00* (2013.01); *H02S 50/10* (2014.12); *H02S 99/00* (2013.01); *G06F 2119/06* (2020.01);

(Continued)

(58) Field of Classification Search
CPC ...... G06F 30/20; G06F 2119/06; H02J 3/383; H02S 50/10; H02S 50/00; H02S 99/00; G06Q 10/04; G06Q 50/06; Y02E 10/563; Y02E 60/76; Y04S 40/22
See application file for complete search history.

(56) References Cited

U.S. PATENT DOCUMENTS

| | | |
|---|---|---|
| 3,872,286 A | 3/1975 | Putman |
| 4,280,061 A | 7/1981 | Lawson-Tancred |

(Continued)

FOREIGN PATENT DOCUMENTS

| | | |
|---|---|---|
| WO | WO 02/25987 | 3/2002 |
| WO | WO 2006/119031 | 11/2006 |

OTHER PUBLICATIONS

"Atlas DCA," Peak Electronic Design, Ltd., 2008.

(Continued)

*Primary Examiner* — Alexander Satanovsky
*Assistant Examiner* — Mark I Crohn
(74) *Attorney, Agent, or Firm* — Sheridan Ross P.C.

(57) ABSTRACT

The present invention provides methods and systems to estimate energy losses due to soiling in photovoltaic (PV) systems from data including the measured energy and power produced over the lifetime of the system, the system size and configuration data, the weather conditions (including irradiance, precipitation, ambient and panel temperature, and wind conditions) over the lifetime of the system, and derived meteorological condition information (e.g., the history of clear-sky conditions at the location of the site).

19 Claims, 8 Drawing Sheets

| date | modeled energy (Wh) | measured energy (Wh) | Measured Daily Precipitation (mm) | Daily Performance Ratio |
|---|---|---|---|---|
| 2015-1-1 | 100 | 95 | 0 | 95 / 100 = .95 |
| 2015-1-2 | 80 | 78 | 0 | 78 / 80 = .975 |
| 2015-1-3 | 120 | 115 | 0 | 115 / 120 = .958 |

800 — date; 802 — modeled energy (Wh); 804 — measured energy (Wh); 806 — Measured Daily Precipitation (mm); 808 — Daily Performance Ratio

Related U.S. Application Data (60) Provisional application No. 62/473,515, filed on Mar. 20, 2017.

(51) Int. Cl.
*G06Q 10/04* (2012.01)
*G06Q 50/06* (2012.01)
*G06F 119/06* (2020.01)

(52) U.S. Cl.
CPC .............. *G06Q 50/06* (2013.01); *Y02E 10/56* (2013.01); *Y02E 60/00* (2013.01); *Y04S 40/20* (2013.01)

(56) References Cited

U.S. PATENT DOCUMENTS

| | | | |
|---|---|---|---|
| 4,752,697 A | 6/1988 | Lyons et al. | |
| 5,712,572 A | 1/1998 | Tamechika et al. | |
| 6,311,137 B1 | 10/2001 | Kurokami et al. | |
| 6,425,248 B1 | 7/2002 | Tonomura et al. | |
| 7,020,566 B2 | 3/2006 | Villicana et al. | |
| 7,133,787 B2 | 11/2006 | Mizumaki | |
| 7,336,201 B2 | 2/2008 | Green et al. | |
| 7,742,897 B2 | 6/2010 | Herzig | |
| 8,106,543 B2 | 1/2012 | Huang et al. | |
| 8,115,096 B2 | 2/2012 | Shan et al. | |
| 8,269,374 B2 | 9/2012 | De Caires | |
| 8,373,312 B2 | 2/2013 | O'Brien et al. | |
| 8,682,585 B1 | 3/2014 | Hoff | |
| 8,725,437 B2 | 5/2014 | Caine | |
| 8,738,328 B2 | 5/2014 | Herzig et al. | |
| 9,660,574 B2 | 5/2017 | Caine | |
| 2002/0059035 A1 | 5/2002 | Yagi et al. | |
| 2002/0143693 A1 | 10/2002 | Soestbergen et al. | |
| 2004/0067746 A1 | 4/2004 | Johnson | |
| 2004/0103056 A1 | 5/2004 | Ikeda et al. | |
| 2004/0138977 A1 | 7/2004 | Tomkins et al. | |
| 2004/0148336 A1 | 7/2004 | Hubbard et al. | |
| 2004/0176965 A1 | 9/2004 | Winch et al. | |
| 2004/0177027 A1 | 9/2004 | Adachi | |
| 2004/0230377 A1 | 11/2004 | Ghosh et al. | |
| 2004/0236587 A1 | 11/2004 | Nalawade | |
| 2005/0004839 A1 | 1/2005 | Bakker et al. | |
| 2005/0039787 A1 | 2/2005 | Bing | |
| 2005/0131810 A1 | 6/2005 | Garrett | |
| 2006/0271214 A1 | 11/2006 | Brown | |
| 2007/0162367 A1 | 7/2007 | Smith et al. | |
| 2007/0174219 A1 | 7/2007 | Bryan et al. | |
| 2007/0203860 A1 | 8/2007 | Golden et al. | |
| 2007/0219932 A1 | 9/2007 | Carroll et al. | |
| 2007/0226163 A1 | 9/2007 | Robles | |
| 2008/0091590 A1 | 4/2008 | Kremen | |
| 2008/0091625 A1 | 4/2008 | Kremen | |
| 2008/0172256 A1 | 7/2008 | Yekutiely | |
| 2008/0215500 A1 | 9/2008 | De La Motte | |
| 2009/0177458 A1 | 7/2009 | Hochart et al. | |
| 2009/0222224 A1 | 9/2009 | Lewis et al. | |
| 2010/0174643 A1 | 7/2010 | Schaefer et al. | |
| 2010/0185337 A1 | 7/2010 | Le Pivert | |
| 2010/0219983 A1 | 9/2010 | Peleg et al. | |
| 2010/0271222 A1 | 10/2010 | Kerrigan et al. | |
| 2011/0066401 A1 | 3/2011 | Yang et al. | |
| 2011/0184583 A1 | 7/2011 | El-Barbari et al. | |
| 2011/0210610 A1 | 9/2011 | Mitsuoka et al. | |
| 2011/0282601 A1 | 11/2011 | Hoff | |
| 2013/0085885 A1 | 4/2013 | Sahai et al. | |
| 2013/0264884 A1 | 10/2013 | Kuo et al. | |
| 2014/0018969 A1 | 1/2014 | Forbes | |
| 2014/0188410 A1* | 7/2014 | Kerrigan ................. H02J 3/383 |
| | | | 702/61 |
| 2015/0012258 A1 | 1/2015 | Caine | |
| 2015/0123798 A1 | 5/2015 | Boross et al. | |
| 2015/0188415 A1 | 7/2015 | Abido et al. | |
| 2016/0190984 A1 | 6/2016 | Caine | |
| 2018/0073980 A1* | 3/2018 | Caine ................. H02S 50/00 |
| 2018/0188301 A1 | 7/2018 | McBrearty et al. | |
| 2018/0196092 A1 | 7/2018 | McBrearty et al. | |

OTHER PUBLICATIONS

"CM21 Precision Pyranometer Instruction Manual," Kipp & Zonen, 2004, version 1004, 66 pages.

"PVIQ Performance Analysis," Locus Energy, Oct. 2013, 11 pages [retrieved from: http://locusenergy.com/wp-content/uploads/2013/10/Locus-Energy-PVIQ-Performance-Analysis-White-Paper.pdf].

"Pyranometer Model SP-110 and SP-230 Owner's Manual," Apogee Instruments, Inc., 2013, 18 pages.

Burger et al., "Asset Securitisation," 2006, pp. 1-67.

Chaouachi et al. "A novel multi-model neuro-fuzzy-based MPPT for three-phase grid-connected photovoltaic system," Solar Energy, 2010, vol. 84, pp. 2219-2229.

Geuder et al. Long-term Behavior, Accuracy and Drift of LI-200 Pyranometers as Radiation Sensors in Rotating Shadowband Irradiometers (RSI), Energy Procedia, Dec. 2014, vol. 49, pp. 2330-2339.

Hammer et al., "Solar energy assessment using remote sensing technologies," Remote Sensing of Environment, vol. 86, 2003, pp. 423-432.

Kroposki et al., "Photovoltaic module energy rating methodology development," 25th PVSC, May 13-17, 1996, pp. 1311-1314.

Li et al., "Determining the Optimum Tilt Angle and Orientation for Solar Energy Collection Based on Measured Solar Radiance Data," International Journal of Photoenergy, vol. 2007, No. 85402, 2007, 9 pages.

Patcharaprakiti et al. "Modeling of Photovoltaic Grid Connected Inverters Based on Nonlinear System Identification for Power Quality Analysis," Electrical Generation and Distribution Systems and Power Quality Disturbances, InTech, Nov. 2011, vol. 21, pp. 53-82.

Perez et al., "A New Operational Satellite-to-Irradiance Model—Description and Validation," Manuscript Submitted to Solar Energy, Apr. 2002, retrieved from http://www.asrc.cestm.albany.edu/perez/publications/Solar%20Resource%20Assessment%20and%20Modeling/Papers%20on%20Resource%20Assessment%20and%20Satellites/A%20New%20Operational%20Satellite%20irradiance%20model-02.pdf.

Wang, "The Application of Grey System Theory in Asset Securitization Project," Journal of Grey System, vol. 19, No. 3, 2007, pp. 247-256, abstract only.

Zhu et al., "Outlier identification in outdoor measurement data: effects of different strategies on the performance descriptors of photovoltaic modules," Proceedings of the 34th IEEE Photovoltaic Specialists Conference, Jun. 7-12, 2009, pp. 828-833.

Notice of Allowance for U.S. Appl. No. 13/253,154, dated Jan. 6, 2014, 10 pages.

Official Action for U.S. Appl. No. 14/326,342, dated Oct. 19, 2017 32 pages.

Official Action for U.S. Appl. No. 14/584,202, dated May 18, 2017 26 pages.

Official Action for U.S. Appl. No. 14/584,202, dated Jan. 4, 2018, 37 pages.

Official Action for U.S. Appl. No. 14/957,374, dated Oct. 12, 2016 9 pages.

Notice of Allowance for U.S. Appl. No. 14/957,374, dated Feb. 15, 2017 7 pages.

Official Action for U.S. Appl. No. 15/702,604, dated Apr. 4, 2019, 10 pages.

Official Action for U.S. Appl. No. 13/729,066, dated Nov. 4, 2015, 6 pages. Restriction Requirement.

Official Action for U.S. Appl. No. 13/729,066, dated Mar. 11, 2016, 16 pages.

Official Action for U.S. Appl. No. 13/729,066, dated Aug. 12, 2016, 22 pages.

Official Action for U.S. Appl. No. 13/729,066, dated Jul. 3, 2017, 25 pages.

(56) References Cited

OTHER PUBLICATIONS

Official Action for U.S. Appl. No. 13/729,066 dated Mar. 9, 2018, 24 pages.
Official Action for U.S. Appl. No. 13/726,066 dated Dec. 3, 2018, 35 pages.
Official Action for U.S. Appl. No. 13/726,066 dated May 16, 2019, 37 pages.

* cited by examiner

| timestamp | modeled energy (Wh) 702 | measured energy (Wh) 704 | Clear-sky index 706 |
|---|---|---|---|
| 2015-1-1 12:00 | 10 | 9.9 | .8 |
| 2015-1-1 12:05 | 11 | 11.01 | .98 |
| 2015-1-1 12:10 | 9 | 9.1 | .7 |

| date | modeled energy (Wh) 802 | measured energy (Wh) 804 | Measured Daily Precipitation (mm) 806 | Daily Performance Ratio 808 |
|---|---|---|---|---|
| 2015-1-1 | 100 | 95 | 0 | 95 / 100 = .95 |
| 2015-1-2 | 80 | 78 | 0 | 78 / 80 = .975 |
| 2015-1-3 | 120 | 115 | 0 | 115 / 120 = .958 |

| date | Daily Performance Ratio 902 | Smoothed Performance Ratio 904 | Estimated max efficiency 906 | Daily Soiling rate 908 |
|---|---|---|---|---|
| 2015-1-1 | 95 / 100 = .95 | .97 | .97 | 0 |
| 2015-1-2 | 78 / 80 = .975 | .96 | .97 | .01 |
| 2015-1-3 | 115 / 120 = .958 | .95 | .97 | .02 |

| timestamp | modeled energy (Wh) 1002 | daily soiling rate 1004 | energy lost to soiling (Wh) 1006 |
|---|---|---|---|
| 2015-1-3 12:00 | 10 | .02 | 10 * .02 = .2 |

1000

ESTIMATION OF SOILING LOSSES FOR PHOTOVOLTAIC SYSTEMS FROM MEASURED AND MODELED INPUTS

This application claims priority to provisional patent application 62/473,515 filed Mar. 20, 2017. This application is a continuation in part of application Ser. No. 13/729,066 filed Dec. 28, 2012. The patent or application file contains at least one drawing executed in color. Copies of this patent or patent application publication with color drawing(s) will be provided by the Office upon request and payment of the necessary fee.

The installed base of solar photovoltaic (PV) systems in the United States is large and growing rapidly. Viewed as financial assets, these systems are in aggregate an investment worth tens of billions of dollars. Viewed as a fraction of the power generation on the grid, there is enough solar installed in some localities that the generation of these systems has a material impact on efforts to balance the electric grid. Understanding the performance of these systems relative to expectations is critically important to operations and maintenance efforts which rely on being able to quickly and accurately make decisions about whether or not a system is in need of maintenance based on information that can be collected remotely.

Understanding the performance of these systems is also valuable in contexts that include assessing the financial value of any contract that includes payouts based on the performance of solar assets (e.g., leases, PPA's, guarantees, etc.), assessing the value of the underlying solar assets themselves, or assessing the suitably of a location as a location to install solar assets.

Models that estimate the power generation of PV systems are primarily dependent on the size of the system in question, the solar irradiance incident on the system, and the temperature of the PV modules. There are a variety of models of different levels of complexity that are in common usage and their error characteristics have been discussed in a number of academic and industry conferences and publications. These models are typically calibrated in controlled settings however, and can generate modeling errors that are well above the expected modeling errors when PV systems are affected by factors that do not occur in controlled settings. Such factors include soiling, shading, snow cover, and partial hardware failure. The current state of the art for dealing with errors of this type is to use a derate factor which estimates the fraction of the total energy over the lifetime of the system will be lost for this reason and then reduces all power generation estimates by that fraction. Methodologies like this are destined to produce inaccurate results when there are short term fluctuations in the losses that occur for any of these reasons. One particularly simple example of this is that if derates are used to model losses due to snow cover, then the models will necessarily overestimate energy production in a very snowy winter and underestimate production during a winter with lower than normal snowfall. Augmenting the current state of the art PV performance models to include highly granular categorized loss estimates (including soiling) enables them to better describe the measured performance of real world systems. This is potentially valuable for a wide variety of applications.

With the proliferation of solar photovoltaic (PV) systems as a source of energy generation at residential, commercial, and industrial scales, understanding the performance of these systems in the field, and outside of controlled laboratory conditions, is an increasingly important task with a number of important applications. Soiling of PV systems (i.e., the extent to which dust, dirt, etc. on the panel itself impairs system performance) is one of the principal drivers of PV systems underperforming their expectations in certain climates and geographies, so understanding how and when soiling occurs is therefore an essential piece of efforts to quantify PV system underperformance in general. Since the physical processes that dominate the soiling process are going to depend on information that is not currently able to be obtained economically and efficiently (e.g., extremely granular data on atmospheric particulate compositions) we rely on methods that estimate soiling by proxy based on data that we are able to collect reliably and economically. This methodology provides logic for such an estimate that integrates a number of relevant measured and modeled inputs and which respects physical properties that are known to affect PV panel soiling rates.

The present invention describes the methodology to estimate energy losses due to soiling in PV systems from data including the measured energy and power produced over the lifetime of the system, the system size and configuration data, the weather conditions (including irradiance, precipitation, ambient and panel temperature, and wind conditions) over the lifetime of the system, and derived meteorological condition information (e.g., the history of clear-sky conditions at the location of the site).

These and other features, aspects and advantages of the present invention will become better understood with reference to the following description and claims.

SUMMARY OF THE INVENTION

The present invention relates to a computer processor implemented methods of estimating energy losses due to soiling in PV systems.

According to one embodiment of the present invention, a computer processor implemented method of quantifying the energy losses of a photovoltaic system due to soiling is provided, the method comprising the steps of: inputting into a computer processor modeled energy time series data for a photovoltaic system, wherein the modeled energy time series data includes a set of timestamps and a modeled energy; inputting into a computer processor measured energy time series data, wherein the measured energy time series data includes a set of timestamps and actual measured energy data readings; inputting into a computer processor clear sky ratio time series data and precipitation data, wherein the clear sky ratio time series data includes a set of data points indicating the clear sky index and associated clear sky timestamps and wherein the precipitation data includes a set of data points indicating the precipitation depth at the location of the system and associated precipitation depth timestamps; merging by the computer processor the modeled energy time series data with the measured energy time series data to determine a pointwise ratio of the modeled energy time series data with the measured energy time series data to provide a performance ratio time series having a set of performance ratio time series data points; merging by the computer processor the performance ratio time series with the clear sky ratio time series data and the precipitation data by matching associated measured power and energy time series data timestamps, associated clear sky timestamps and associated precipitation depth timestamps; removing in the computer processor performance ratio time series data points from the set of performance ratio time series data points for clear sky timestamps below a predetermined threshold; recursively calculating by the computer processor a maximum effective performance ratio time series; determining by the computer processor a soiling loss fraction time series; and determining by the computer processor a soiling losses time series, wherein the soiling losses time series is a piecewise product of the soiling loss fraction time series and the modeled energy time series.

These and other features, aspects and advantages of the present invention will become better understood with reference to the following description and claims.

BRIEF DESCRIPTION OF THE DRAWINGS

FIG. 1 depicts the present invention;
FIG. 2 depicts the present invention;
FIG. 3 depicts the present invention;
FIG. 4 depicts the present invention;
FIG. 5 depicts the present invention;
FIG. 6 depicts the present invention;
FIG. 7 depicts the present invention;
FIG. 8 depicts the present invention;
FIG. 9 depicts the present invention;
FIG. 10 depicts the present invention; and
FIG. 11 depicts the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

FIGS. 1-5 provide examples of a monitored renewable energy system (more specifically a photovoltaic array solar panel also referred to herein as a solar photovoltaic system or solar powered system) from which information may be obtained. According to the example shown, there is a server 10 and at least one monitored renewable energy system (e.g. 102, 104, 106, 108, 110, 112) which is provided to a user or consumer. There may be at least one data server (10), at least one generation monitoring device (16) in communication with the monitored renewable energy system (at premise monitored renewable energy system (30)) and at least one communication node (22) in communication with at least one of the monitored renewable energy system (30), the generation monitoring device (16) and the data server (10). It should be understood the data server may be a single computer, a distributed network of computers, a dedicated server, any computer processor implemented device or a network of computer processor implemented devices, as would be appreciated by those of skill in the art. The monitored renewable energy system may have background constants that are entered into the system during data setup; populating this part of the data structure is one of the initial steps to the process. During this time, all required (or potentially required) background information may be loaded into the system. This data will later be used for system calculations and diagnostics. Background constants may include: (1) Full Calendar with sunrise and sunset according to latitude throughout the year; (2) Insolation or 'incident solar radiation': This is the actual amount of sunlight falling on a specific geographical location. There are expected amounts of radiation which will fall on an area each day, as well as an annual figure. Specific Insolation is calculated as kWh/m2/day. The importance of this variable is that it can combine several other Background Constants; and (3) Location Functionality. It is envisioned that some of this information may be input and some may be determined automatically. The proximity of each system to each other system may be determined, and forms a part of the methods used to determine the geographic average of the renewable energy systems. While there are different specific methods of implementing Location Functionality, generally this relies on a large database of locations which are tied to zones. Because the relational distances between the zones are stored within the software, the distances between any two locations can then be easily and accurately calculated.

The term production data refers to any data that is received from the photovoltaic system and/or solar irradiance sensor. The energy generated by each monitored renewable energy system and/or solar irradiance sensor is recorded as production data and the data server may then determine comparative information based upon at least one of the background constant, the diagnostic variable, the system coefficient and the energy generated to determine a comparative value of the monitored renewable energy system. The term comparative value is intended to include any value that compares one system to another system or a group of systems. For example, this may be as simple as an "underperforming" designation when the system's performance is less than another system or group of systems performance in terms of power generated.

A sample system may have a router (12) and at least one inverter (14) in communication with the monitored renewable energy system (e.g. 50, 30). The inverter (14) is an electronic circuit that converts direct current (DC) to alternating current (AC). There may also be at least one return monitor (18) (associated with electric panel (24)) determining the energy returned to a grid by the at-least one monitored renewable energy system. At least one background constant may be determined and saved in the data server(s). The monitored renewable energy system (e.g. 30, 50) may be at least partially powered by at least one alternate energy source. There may be at least one generation monitoring device (e.g. 58), which calculates the energy generated at each consumer's premises by the monitored renewable energy system (e.g. 30, 50); at least one communication node (64) in communication with each at least one generation monitoring device (e.g. 58); at least one data server (10) in communication with communication node (e.g. 64), wherein the data server(s) (10) accept information from the communication node (e.g. 64) to determine the power generated at a first user's premises (100) and compare the power generated at a first user's premises (100) to Comparative Information obtained from at least two monitored renewable energy systems (e.g. 102, 104, 106, 108, 110, 112, 114) to determine if the first user's monitored renewable energy system (100) is within a predetermined deviation from the comparative information. This may provide a comparative value. The communication node may be further comprising a data storage means for storing usage information. For example, the communication node (64) may be a computer with a hard drive that acts as a data storage means for storing usage information. The generation monitoring device may be selected from the group consisting of pulse meter, temperature meter, electromechanical meter, solid state meter, flow meter, electric meter, energy meter and watt meter. There may also be at least one return monitoring device in communication with the inverter which calculates the energy returned to a grid by the system.

The monitored renewable energy system may be, for example, a solar system, solar panel system, photovoltaic, thermal, wind powered, geothermal, hydropower. A secondary energy source (e.g. 52) may be in communication with and at least partially powering the monitored renewable energy system. It should be understood, though, this is only for ancillary power in the event that the renewable energy source (50) is not capable of entirely powering the at premise monitored renewable energy system.

The generation monitoring device may be any type of meter, by way of example, this may include a pulse meter, temperature meter, electromechanical meter, solid state meter, flow meter, electric meter, energy meter and watt meter. An installation will have a communication node or hub set up at the location with the system. One of the communication nodes may act as a hub. These devices connect to the internet (20) and send the data collected by the nodes to the Server. They have the following properties: The hub has a web server and connects to a standard internet connection (Ethernet). It does not require a computer or other device to make this connection. Each hub has its own unique IP or DNS address. The hub is configured by a web browser. The web browser allows the hub to have specific nodes assigned to it. This set up feature will allow another hub in the area to be set up with its own nodes so that all can operate wirelessly without disruption. Also, the hub is able to configure specific aspects of the hub, such as the connection with the server, data recording and time settings and the ability to configure the attached nodes, including their recording properties.

Each installation may have two or more Data Nodes. These are typically connected wirelessly to the Hub, and connected directly to the inputs/outputs from the Solar Hot Water system (50). They communicate constantly with the Hub, transferring data which the Hub then sends up to the server (10). They may have the following properties: The first Required Node connects to a flow meter (56) attached to the Water Tank that is connected to the Solar Hot Water system. This Node will operate as a pulse meter, 'clicking' whenever a unit (either a gallon or a liter) of hot water passes from the tank. The second Required Node connects to either the electric panel at the switch for the Hot Water tank's electric power OR to a flow/other meter for gas/oil to the secondary heater for the Hot Water tank. The Node may have a data storage means for storing flow/usage information. Together, the data gathered from these Required Node connections allow the software on the serve to convert the utilized hot water into an accurate reading of utilized solar energy by subtracting the energy required to by the secondary heating mechanism. The term utilized generation refers to the energy generated by the at-premise power system, less any energy that has not been consumed by the at premise power system (e.g. the energy used to heat water that remains in the tank and is not subsequently used). Note that the term "at-premise power system" is one type of monitored renewable energy system, as claimed. There may also be other Nodes, which may be used to measure other aspects of the system and gain even more accurate readings. For example: the temperature of the hot water on an ongoing basis. The system may be monitored from a remote location (such as a computer in a different location).

The components node (100), hub (102) and server (10) make up the required core components needed to accurately measures the actual usable output from a Solar Hot Water (SHW) system. Essentially, the hub (102) connects to multiple nodes (100) which simultaneously measure the secondary power going into the system along with the hot water going out (54). Controlling for any background power requirements (e.g. for pumping), it can measure the usable BTUs created by solar by analyzing the measurements at the server (10) level.

Before installing a photovoltaic system in a given location, an estimate of performance expectations is created considering the locational context, typical climate and proposed equipment. Performance expectation estimates also employ assumptions regarding factors that could reduce performance, such as shading, equipment mismatch, and soiling. Properly choosing these assumptions is one of the more difficult aspects of system modeling. Measured performance of an installed system is often compared against the performance expectations to understand if a photovoltaic system is functioning properly.

Figure 1:
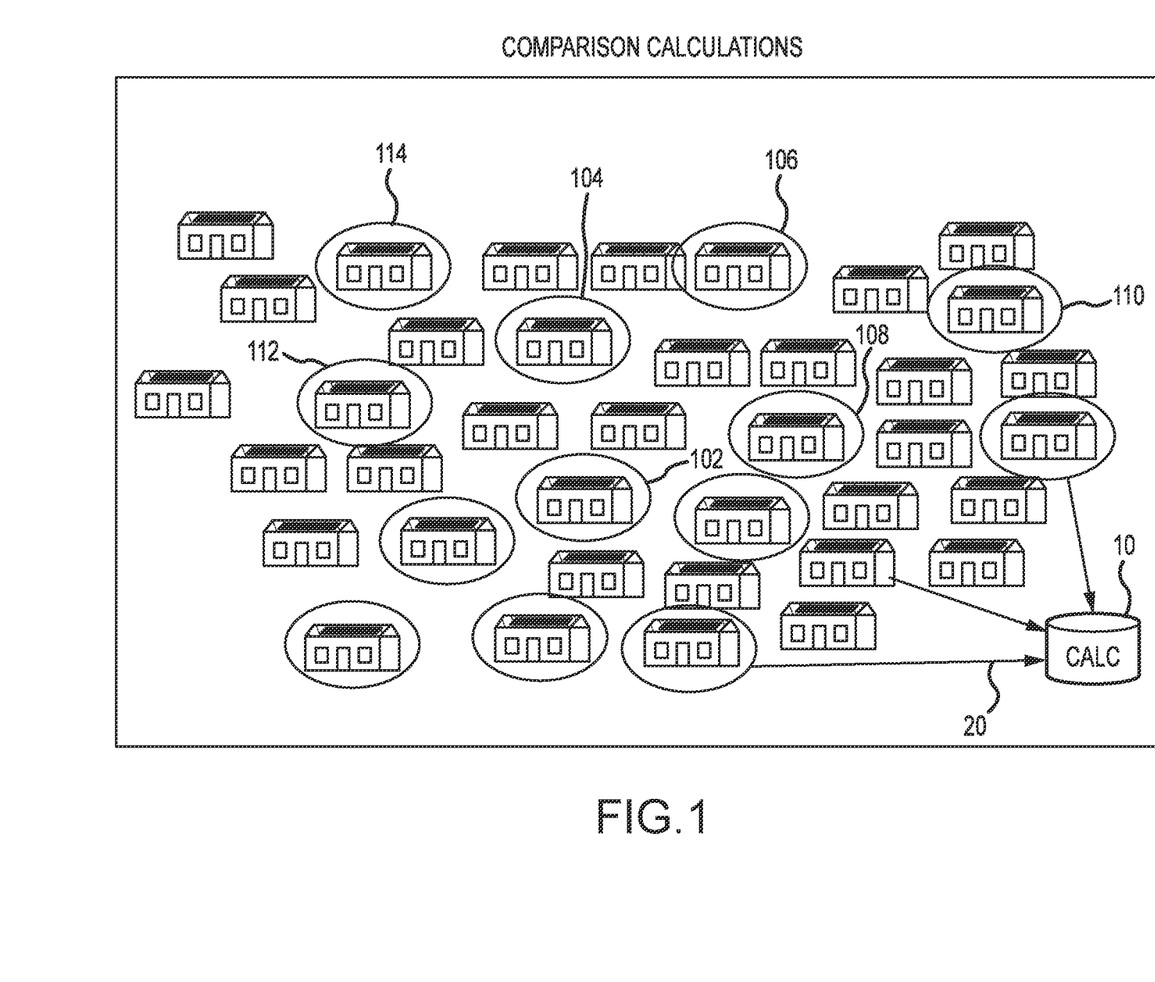
Figure 2:
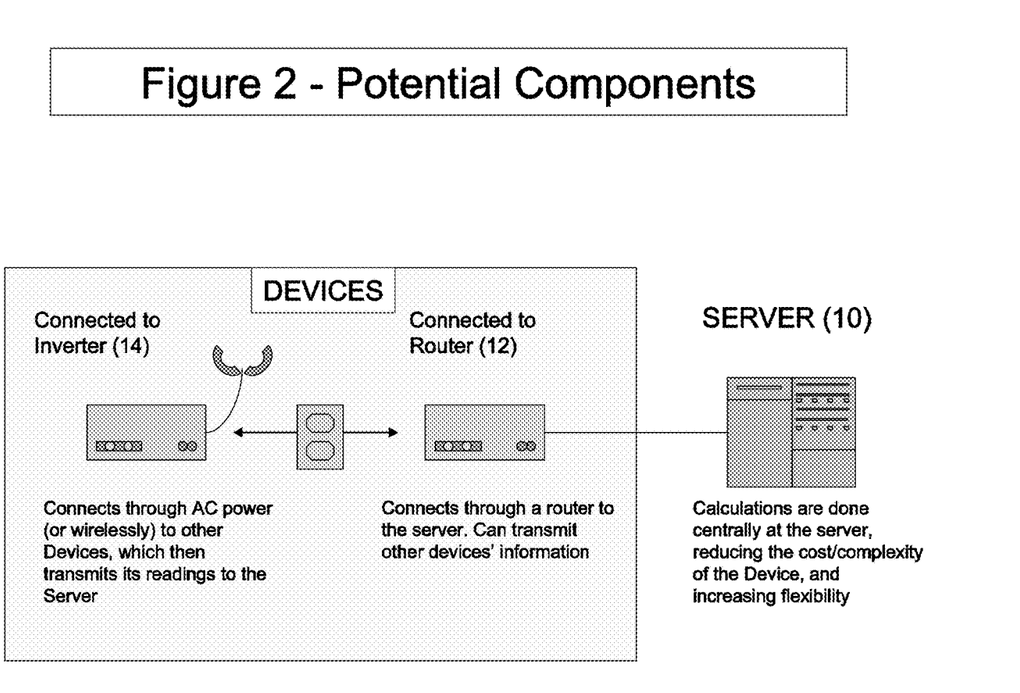
Figure 3:
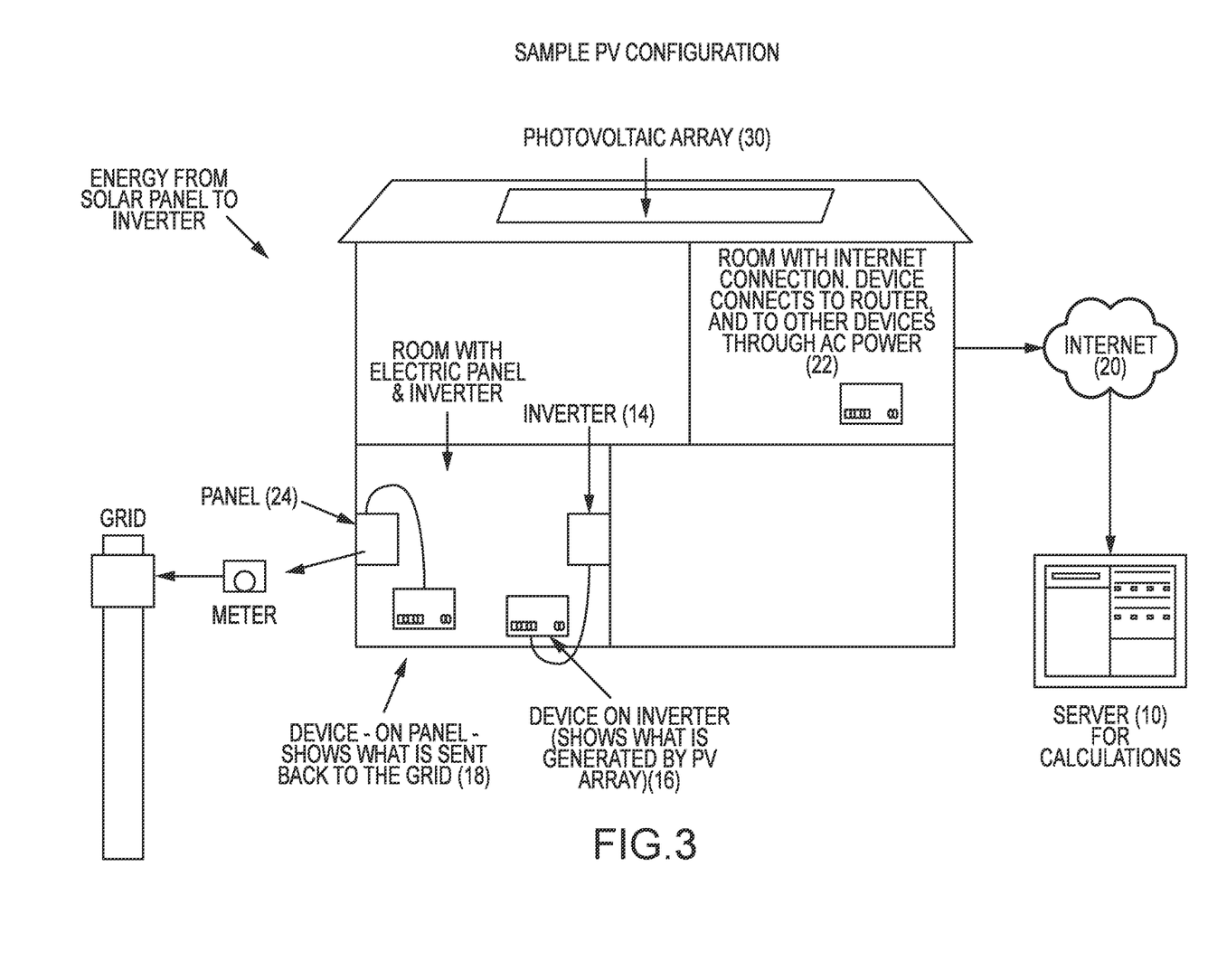
Figure 4:
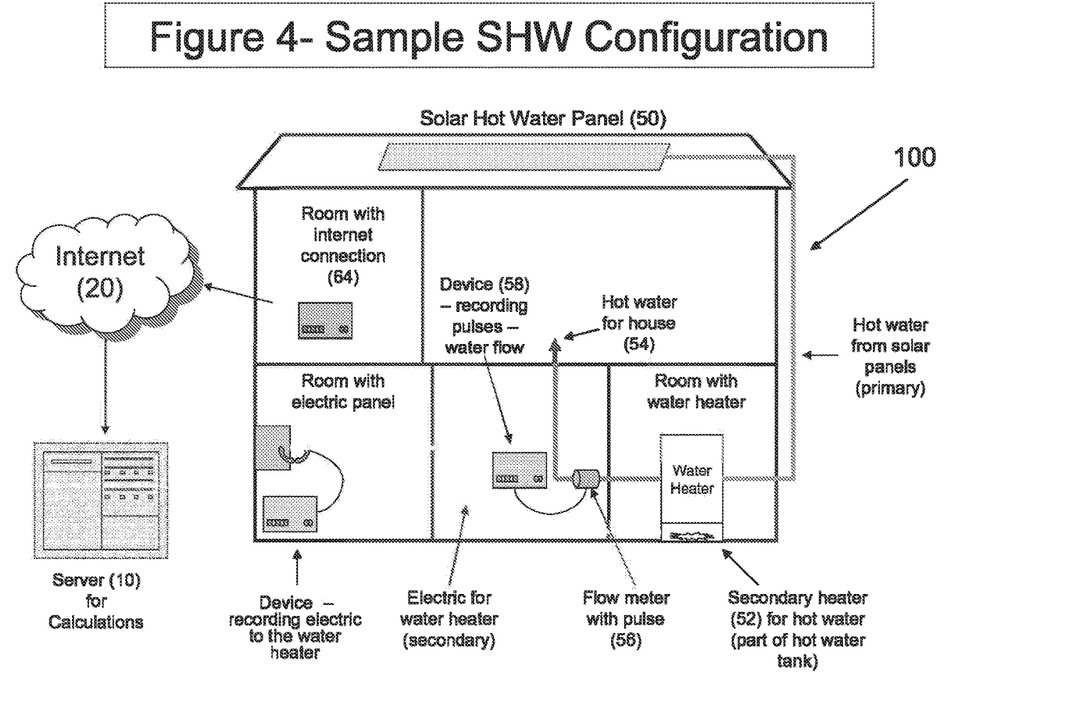
Figure 5:
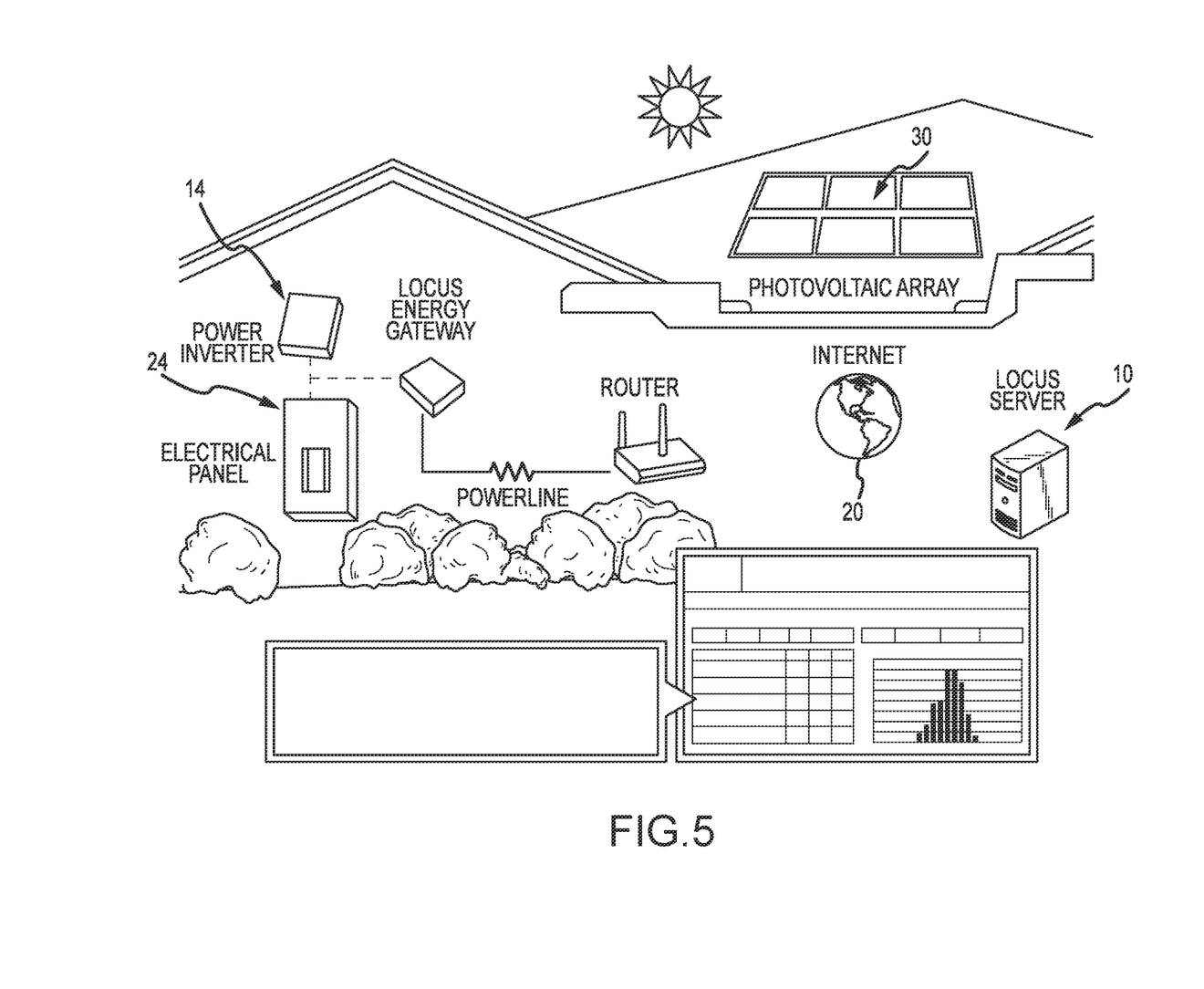
Figure 6:
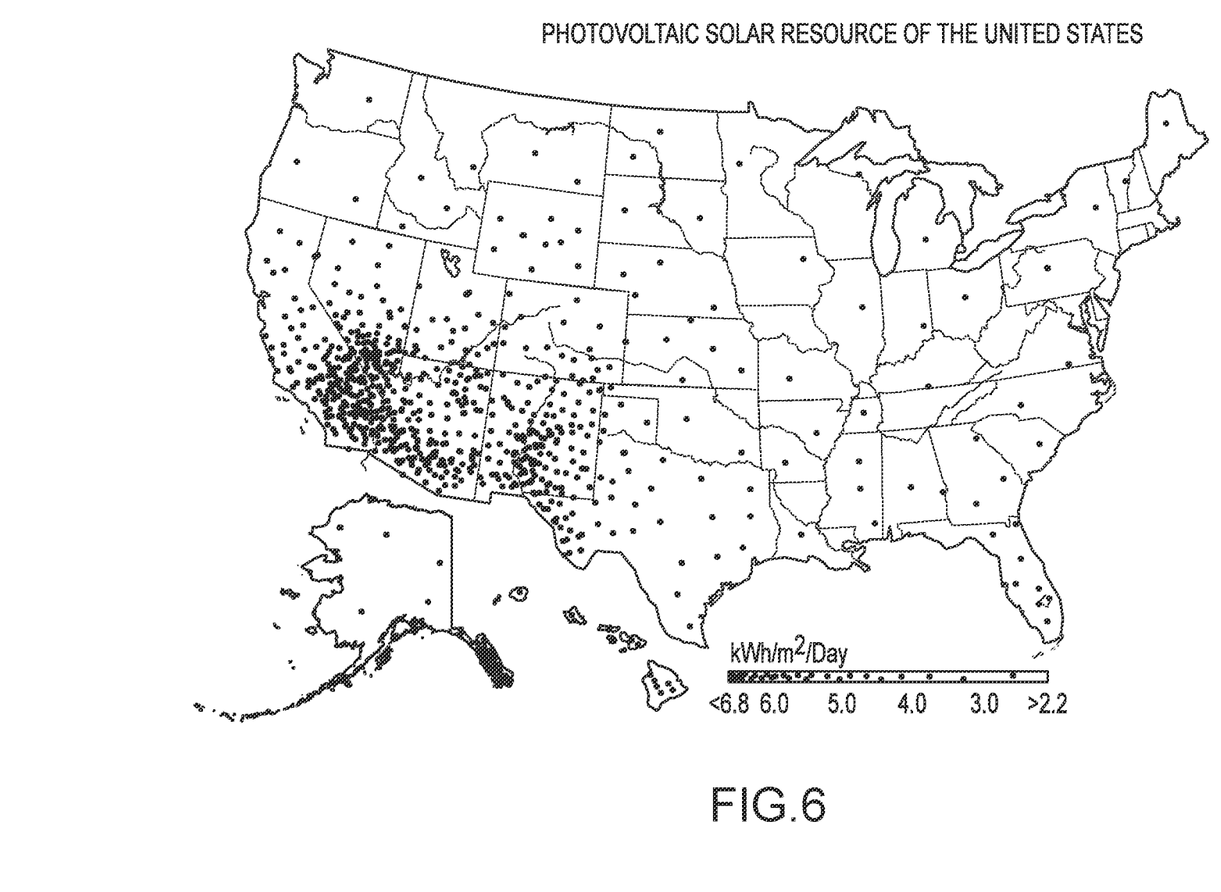
Figure 7:
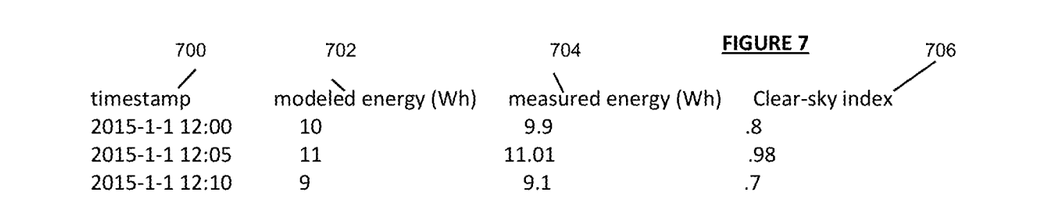
Figure 8:
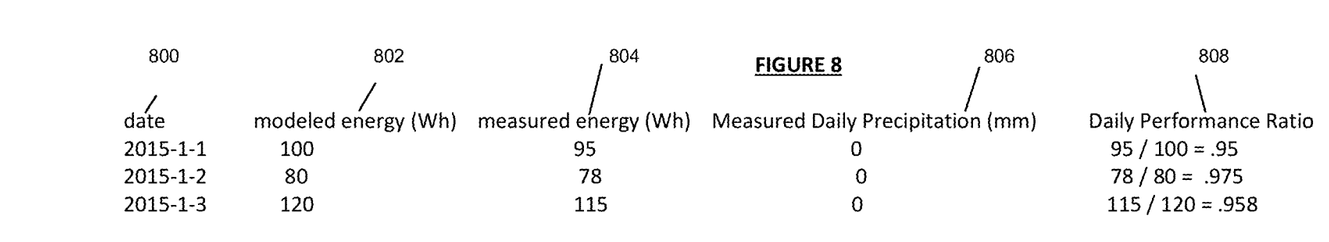

Shading and soiling losses reduce the incoming incident irradiance that strikes the PV panel. Cell temperature is either directly measured by a weather station on site, or calculated using incident irradiance, ambient temperature, and wind speed. FIG. 6 depicts a photovoltaic resource map. As can be seen, the southwestern portion of the United States has the greatest potential photovoltaic resources.

The present invention provides a process and logic that estimates the amount by which the energy generation of a solar photovoltaic (PV) system is reduced by panel soiling from the measured energy and power produced over the lifetime of the system, the system size and configuration data, the weather conditions (including irradiance, precipitation, ambient and panel temperature, and wind conditions) over the lifetime of the system, and derived meteorological condition information (e.g., the history of clear-sky conditions at the location of the site)

The Methodology is comprised of the following background variables, input parameters and logic based on those variables.

MEASURED POWER AND ENERGY DATA: This data is measured with an on-site physical sensor installed with a PV system or within the inverter.

SYSTEM CONFIGURATION DATA: This data describes the size, orientation (tilt and azimuth angles for the panels), and location of the system.

IRRADIANCE DATA: On-site measured irradiance data and/or satellite modeled irradiance data.

WEATHER DATA: This includes temperature, precipitation and/or wind conditions data from on-site and/or nearby weather stations.

MODULE TEMPERATURE DATA: measured data from sensors on individual PV modules.

CLEAR SKY DATA: Time series data that can be derived from the irradiance data using algorithms that have appeared in publicly available academic literature. This data describes the fraction of the sky which is free of clouds.

SNOW DATA: Estimates of the precipitation in the form of snow and snow depth at the location of the system.

MODELED POWER AND ENERGY DATA: Estimates of what the power and energy production of the PV system would have been in the absence of soiling. This should be calculated using industry standard best practices in PV system performance modeling.

As depicted in FIGS. 7, 8, 9 and 10, a computer processor implemented method of quantifying the energy losses of a photovoltaic system due to soiling is provided, the method comprising the steps of: inputting into a computer processor modeled energy time series data for a photovoltaic system, wherein the modeled energy time series data includes a set of timestamps (700) and a modeled energy (702). The modeled power and energy time series data may be calculated from irradiance data weather data and system configuration information. The modeled power and energy time series data may be calculated from irradiance data, weather data and system configuration information and provide an estimate of what the power and energy production of a photovoltaic system would be in the absence of soiling. The modeled power and energy time series data may be according to configuration data, wherein the configuration data includes at least one of size of the photovoltaic system, orientation of the photovoltaic system and location of the photovoltaic system. It should be noted that this is a sample of the series data and there may be a large number of timestamps (700) and associated modeled energy (702). The next step may be inputting into a computer processor measured energy time series data, wherein the measured energy time series data includes a set of timestamps (702) and actual measured energy data readings (704). The measured energy time series data may be measured with an on-site physical sensor installed in a photovoltaic system or an inverter. The measured energy time series data may include measured irradiance data. The measured energy time series data may be according to at least one of solar irradiance data at the location of the photovoltaic system, weather data including temperature, wind conditions and precipitation at the location of the photovoltaic system, module level measured temperature data; snow depth and precipitation data for the location of the PV system. The next step may be inputting into a computer processor clear sky ratio time series data and precipitation data, wherein the clear sky ratio time series data includes a set of data points indicating the clear sky index (which is the fraction of the sky which is free of clouds) (clear sky index (706)) and associated clear sky timestamps (700) and wherein the precipitation data includes a set of data points indicating the precipitation depth (806) at the location of the system and associated precipitation depth timestamps. The precipitation depth may be snow depth. The clear sky ratio time series data may be from derived data on the clear sky conditions at the location of the PV system. The clear-sky index can be approximated by the measured global horizontal irradiance (i.e., the measurement from a sensor pointed directly upwards) divided by the clear sky irradiance. Methods for calculating the clear sky irradiance and a very thorough analysis of clear sky irradiance models by Sandia national lab may be found at: http://prod.sandia.gov/techlib/access-control.cgi/2012/122389.pdf Note that FIGS. 7-10 depict merged timestamp data. The next step may be merging by the computer processor the modeled energy time series data with the measured energy time series data to determine a pointwise ratio of the modeled energy time series data with the measured energy time series data to provide a performance ratio time series having a set of performance ratio time series data points (daily performance ratio (808)). The next step may be merging by the computer processor the performance ratio time series with the clear sky ratio time series data and the precipitation data by matching associated measured power and energy time series data timestamps, associated clear sky timestamps and associated precipitation depth timestamps. As would be understood by one of ordinary skill in the art, the data is grouped by timestamp. So, for example, matching time stamps for different data are matched up. For example, in FIG. 8, the modeled energy (802), measured energy (804), measured daily precipitation (806) are merged by the date (timestamp (800)) and a daily performance ratio (808) is calculated. The different readings are correlated to one another by timestamp (800). The next step may be removing in the computer processor performance ratio time series data points from the set of performance ratio time series data points for clear sky timestamps below a predetermined threshold. For example, we may remove data points with a clear sky index below 0.9. There may be the step of smoothing the performance ratio time series data points. Examples of smoothing techniques may be curve fitting, additive smoothing, Butterworth filters, digital filters, exponential smoothing, Kalman filters, kernel smoothing, Kolmogorov-Zurbenko filters, Laplacian smoothing, local regression, low-pass filters, moving average, Ramer-Douglas-Peucker algorithm, Savitzky-Golay smoothing filter based on the least-squares fitting of polynomials to segments of the data, Smoothing spline and Stretched grid method. These are all by way of example only and not intended to be taken in a limiting sense.

Figure 9:
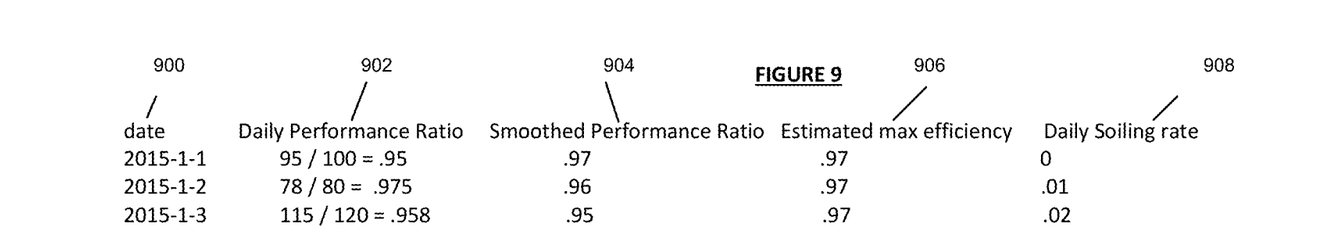
Figure 10:
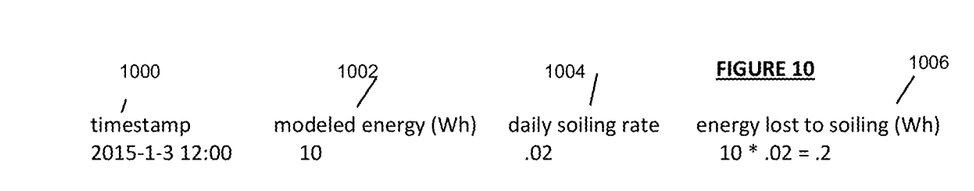
Figure 11:
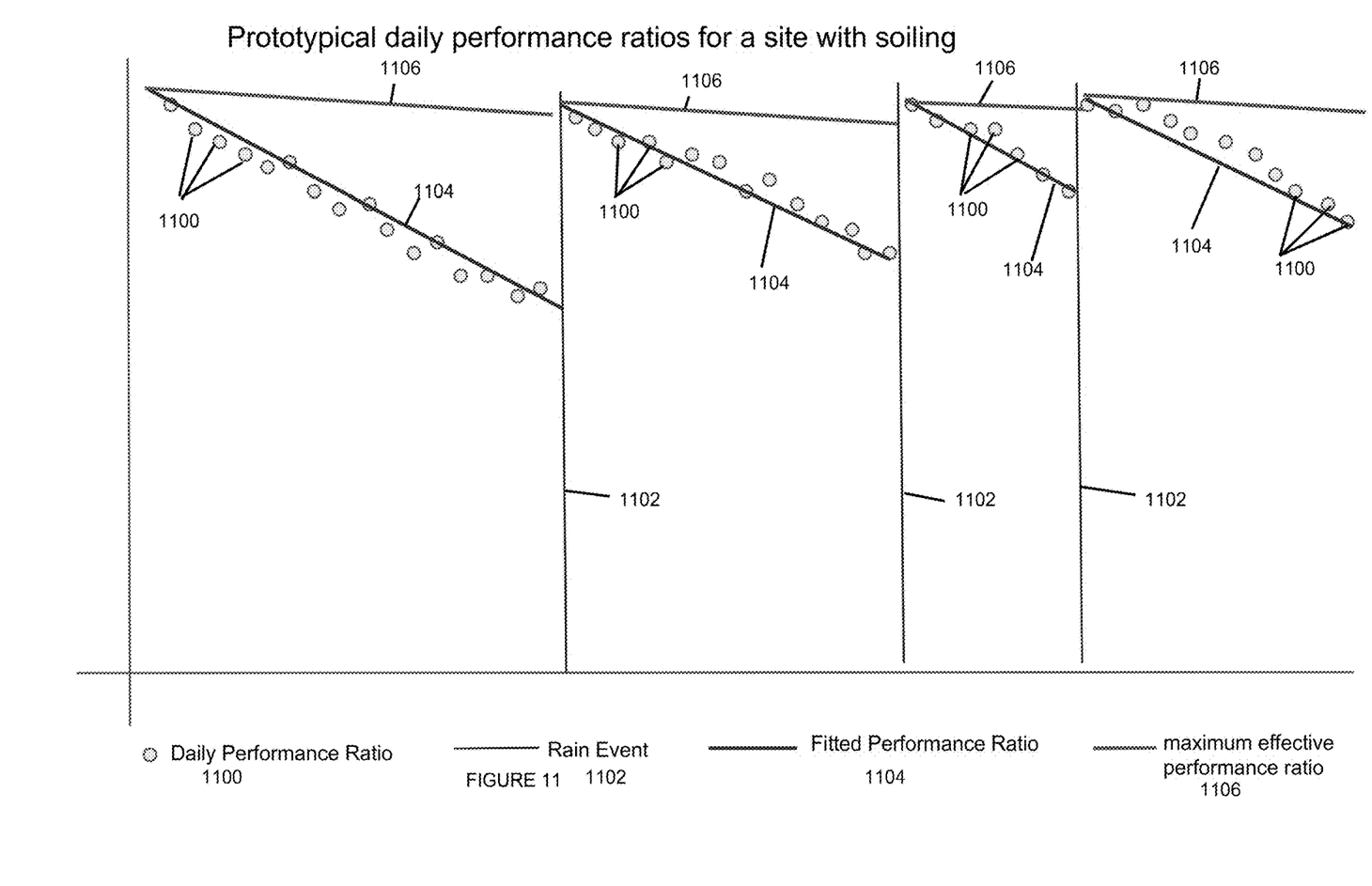

Next we recursively calculate by the computer processor a maximum effective performance ratio time series (1106). FIG. 11 depicts an example of recursively calculating the maximum effective performance ratio time series. The step of recursively calculating by the computer processor a maximum effective performance ratio time series may be performed by setting an initial value equal to a performance ratio for a given time in the performance ratio time series and iteratively subtracting from a previous value an estimate of typical panel degradation for a time interval. The step of iteratively subtracting from a previous value an estimate of typical panel degradation for a time interval is not performed in the case of an event that is large enough to clean a photovoltaic system. The event may be a rain or snow event. FIG. 9 depicts daily soiling rates (908) which are estimated by taking the difference between the estimated maximum efficiency (906) and the smoothed performance ratio (904), which is smoothed from the daily performance ratio (902) which is a series grouped by timestamps (900).

The daily performance ratios (1100) are plotted and we expect to see the performance increase after a rain event (1102). The estimated maximum efficiency is at the maximum effective performance ratio (1106), which falls at the rate that the panels are expected to degrade (0.5% per annum is the industry standard assumption). The fitted performance ratio line (1104) is the efficiencies inferred from the measured data and the difference between them is what is lost to soiling. The precipitation data tell us when the panels are cleaned by rain (rain event 1102). Once we have the difference between the fitted performance ratio (1104) and the maximum effective performance ratio (1106), we can determine daily soiling rates (claimed as determining by the computer processor a soiling loss fraction time series). This is depicted in FIG. 9 as the estimated maximum efficiency (906) minus the smoothed performance ratio (904) to arrive at the daily soiling rate (908). The soiling loss fraction time series is the difference between the maximum effective performance ratio time series and the performance ratio time series. The terms fitted performance ratio and smoothed performance ratio are equivalent. The terms maximum effective performance ratio and estimated maximum efficiency are also equivalent. The next step, depicted in FIG. 10, may be determining by the computer processor a soiling losses time series, wherein the soiling losses time series is a piecewise product of the soiling loss fraction time series (1004) and the modeled energy time series (1002). Note that only one entry in the time series is depicted, for example purposes, to show that the soiling losses can be calculated for every timestamp (1000) by inputting the daily soiling rate (1004) and multiplying it by the modeling energy (1002) to arrive at the energy lost to soiling (1006).

The step of recursively calculating by the computer processor a maximum effective performance ratio time series may be performed by setting an initial value equal to a performance ratio for a given time in the performance ratio time series and iteratively subtracting from a previous value an estimate of typical panel degradation for a time interval. The step of iteratively subtracting from a previous value an estimate of typical panel degradation for a time interval may not be performed in the case of an event that is large enough to clean a photovoltaic system. The event may be, for example, a rain or snow event.

The method may also comprise the steps of validating compliance with cleaning contracts. This also for remote checking of compliance with contracts. Sites may have associated contracts for cleaning, and the methodology described here can be used to remotely check that the contracts are being followed. Solar installations are often geographically dispersed, so it can be difficult to ensure that scheduled system cleanings are actually be followed. This methodology provides a way to validate sites have been cleaned without requiring additional on-site visits.

The modeled power and energy time series data should be calculated from the irradiance data, weather data, and system configuration information using industry standard power and energy generation PV modeling techniques. The measured and modeled energy time series need to be merged so that the pointwise ratio of these two time series can be calculated. Call this time series of ratios the performance ratio time series. Merge the performance ratio time series with the clear sky ratio time series data and the precipitation and snow data by matching time stamps. Remove performance ratio data points for timestamps with clear sky ratios below a threshold chosen to eliminate performance ratio data points that are too noisy. Optionally use a statistical denoising technique to smooth the performance ratio time series so that its temporal variability matches a prior expectation for the temporal variability of a soiling loss fraction time series. If the measured irradiance data is of sufficiently high quality, the performance ratio time series may already have sufficiently low temporal variability, in which case this step can be skipped. Recursively calculate the maximum effective performance ratio time series. At the beginning of the time series when the system has just been installed and is known to be clean and working optimally, this will be the same as the performance ratio of the system. It is calculated iteratively from its previous value by subtracting an estimate of the typical panel degradation in the time interval except in the case of a rain/snow event that is large enough that it will surely clean the PV system. In this case, equalize the performance ratio time series and the maximum effective performance ratio time series for the time series. Calculate the soiling loss fraction time series as the difference between the maximum effective performance ratio time series and the performance ratio time series. Calculate the soiling losses time series as the piecewise product of the soiling loss fraction time series and the modeled energy time series.

The present invention has many uses and advantages. It may be used to Quantify energy losses due to soiling for a PV system. Applying the methodology described here to data collected for a PV system will generate estimates of the energy losses due to soiling. Potential uses of this information include: validating design (i.e., pre-build) estimates of the expected soiling losses for a PV system; improving methodologies for calculating design estimates of expected soiling losses for a PV system; verifying guarantees about the level of soiling losses for a PV system; and determining a cause for PV systems underperforming contractual performance guarantees. Quantifying the monetary losses due to soiling for a PV system. Once an estimate of the energy losses due to soiling for a PV system are in place it is possible to estimate the monetary losses incurred due to this lost energy production using an electricity price rate schedule for the location in question. There are a number of potential uses for this information including: Panel Cleaning Schedule Planning: Once a dollar value has been placed on the value of soiling losses for a period, it is possible to determine whether or not it would have been an economical decision to clean the panels. Attributing a cause to monetary losses due to PV systems underperforming guaranteed performance levels. Forecast the energy (monetary) losses due to future soiling. Once we have information on how quickly a site tends to soil during different times of the year, we can then use historical climatological data (irradiance and precipitation) to predict future energy (and therefore monetary) losses due to soiling at a site under the assumption that nothing else changes about the system. Potential uses include: decision making about when and whether or not to clean panels to avoid expected future soiling losses. It can be utilized by the homeowner to better make decisions about energy usage patterns. (e.g. if particularly energy intensive tasks are scheduled to coincide with solar production to avoid some types of demand charges, then current soiling level information will give better short term energy generation forecasts which will improve the ability to make decisions of this type optimally.) This information could also be utilized by home automation technologies. Assessing the risk in or assessing the value of performance guarantees on the energy production of a PV system. Assessing the value of solar PV assets: estimates of the future soiling losses of a site can be used as an input to more precisely assess the value of a solar PV asset. This can be applied to individual PV system, fleets of solar assets or interests therein, or to PV assets sold as part of a larger residential or commercial real estate transaction. Assessing the value of financial products collateralized against residential or commercial real estate that includes a PV system: Installing a PV system on a residential or commercial building will change the value of that property, and estimates of future soiling losses can be used to more accurately assess that change. Any financial product collateralized against such a property can then be more accurately valued if the value of the PV system that is a part of the collateral can be more precisely valued.

The present invention may also be utilized in PV System Underperformance Detection: Detecting when and why PV systems are underperforming based on their energy generation is a challenging task for a variety of reasons. One of the main reasons is that a large number of factors (including soiling) can affect system performance. This dramatically complicates efforts to detect when a PV system is underperforming for a reason where corrective action can profitably be taken. Accurate estimates of the degree to which a PV system is soiled will make this task easier by removing a major confounding factoring that could otherwise hinder the performance of a system which detects underperforming PV systems from their energy generation data.

Soiling Maps: Applying the methodology described here to the energy generation history of a large and geographically distributed fleet of systems should be able to generate maps that show to what extent different geographies are affected by soiling in different seasons. Due to the large factor that geography plays in driving PV panel soiling, knowing the extent to which a nearby PV system has been affected by soiling should be strongly predictive of future soiling of a PV system at a location. Uses include: Prospecting: Knowledge of likely soiling of a system based on its location can lower the risk of energy under-generation for a PV system that is potentially going to be built. Generation of optimal PV system cleaning strategies based on the location of systems. Solar permitting, grid operations and planning: Knowledge of typical soiling levels across a representative sample of PV systems could allow grid operators to more precisely predict the effect that deployment of solar assets will have on the overall operation of the electric grid. This information could be used in the context of predicting the effects for the grid of issuing more permits for solar generation resources. Assessing the value of non-solar electrical generation resources. Continuing the previous point, if this information is useful in assessing the impact of solar generation on the grid, this information can also be used to inform energy price estimates and expected utilization levels for non-solar energy generation resources (e.g., coal or natural gas power plants)

Near-term Generation and Grid Load Forecasting: The impact of behind-the-meter solar generation is increasingly important to incorporate into PV generation forecasts, or in the case of behind-the-meter solar, grid load forecasts. Because soiling can significantly reduce PV system output at times throughout the year, having information on how much soiling is reducing the output of PV systems in an area will be an important part of accurately forecasting PV generation and net demand (load) for an area. For example, if an area has experience high levels of soiling this year, the current soiling rate could be incorporated into the day-ahead PV generation and load forecasts for the region to improve the accuracy of these forecasts.

The present invention envisions all of these enumerated uses and advantages by providing a system for the estimation of PV system energy losses due to panel soiling based on: measured power and energy data for the system; configuration data describing the size, orientation and location of the system; solar irradiance data at the location of the PV system; weather data including temperature, wind conditions and precipitation at the location of the PV system; module level measured temperature data; snow depth and precipitation data for the location of the PV system; derived data on the clear sky conditions at the location of the PV system; and modeled power and energy data for the system.

It should be understood that the foregoing relates to preferred embodiments of the invention and that modifications may be made without departing from the spirit and scope of the invention as set forth in the following claims.

We claim:

1. A method of monitoring a photovoltaic system and quantifying the energy losses due to soiling, comprising:
    providing a computer system with a processor;
    inputting into the computer processor modeled energy time series data for a photovoltaic system at a location, wherein the modeled energy time series data includes a set of timestamps and a modeled energy;
    receiving measured energy time series data for the photovoltaic system, wherein the measured energy time series data includes a set of timestamps and actual measured energy data readings;
    inputting the measured energy time series data into the computer system;
    inputting into the computer system clear sky ratio time series data and precipitation data for the location of the photovoltaic system, wherein the clear sky ratio time series data includes a set of data points indicating the clear sky index and associated clear sky timestamps, where the clear sky index is a fraction of the sky at the location of the photovoltaic system which is free of clouds, and wherein the precipitation data includes a set of data points indicating the precipitation depth at the location of the photovoltaic system and associated precipitation depth timestamps;
    merging by the computer processor the modeled energy time series data with the measured energy time series data to determine a pointwise ratio of the modeled energy time series data with the measured energy time series data to provide a performance ratio time series having a set of performance ratio time series data points;
    merging by the computer processor the performance ratio time series with the clear sky ratio time series data and the precipitation data by matching associated measured energy time series data timestamps, associated clear sky timestamps and associated precipitation depth timestamps;
    removing in the computer processor performance ratio time series data points from the set of performance ratio time series data points for clear sky timestamps below a predetermined threshold;
    recursively calculating by the computer processor a maximum effective performance ratio time series;
    determining by the computer processor a soiling loss fraction time series;
    determining by the computer processor a soiling losses time series, wherein the soiling losses time series is a piecewise product of the soiling loss fraction time series and the modeled energy time series; and
    determining, with the soiling losses time series, compliance with a contract to clean the photovoltaic system to ensure scheduled cleaning has occurred.

2. A method as in claim 1, wherein the modeled energy time series data is calculated from: (1) irradiance data and weather data at the location of the photovoltaic system; and (2) configuration information of the photovoltaic system.

3. A method as in claim 1, further comprising:
    after the step of removing performance ratio time series data points, smoothing the performance ratio time series data points.

4. A method as in claim 1, wherein the soiling loss fraction time series is the difference between the maximum effective performance ratio time series and the performance ratio time series.

5. A method as in claim 1, wherein the measured energy time series data is measured with an on-site physical sensor installed in the photovoltaic system or an inverter.

6. A method as in claim 1, wherein the modeled energy time series data is calculated from irradiance data, weather data and photovoltaic system configuration information and provides an estimate of what the power and energy production of the photovoltaic system would be in the absence of soiling.

7. A method as in claim 1, wherein the measured energy time series data includes measured irradiance data.

8. A method as in claim 1, wherein recursively calculating by the computer processor a maximum effective performance ratio time series is performed by setting an initial value equal to a performance ratio for a given time in the performance ratio time series and iteratively subtracting from a previous value an estimate of typical panel degradation for a time interval.

9. A method as in claim 8, wherein the step of iteratively subtracting from a previous value an estimate of typical panel degradation for a time interval is not performed after a precipitation event that cleans the photovoltaic system.

10. A method as in claim 9, wherein the precipitation event is a rain event.

11. A method as in claim 1, wherein the modeled energy time series data is according to configuration data, wherein the configuration data includes at least one of size of the photovoltaic system, orientation of the photovoltaic system and location of the photovoltaic system.

12. A method as in claim 1, wherein the measured energy time series data is according to at least one of solar irradiance data at the location of the photovoltaic system, weather data including temperature, wind conditions and precipitation at the location of the photovoltaic system, module level measured temperature data, snow depth and precipitation data for the location of the photovoltaic system.

13. A method as in claim 1, wherein the clear sky ratio time series data is from derived data on the clear sky conditions at the location of the photovoltaic system.

14. A method as in claim 1, wherein the precipitation depth is snow depth.

15. A method as in claim 1, wherein the predetermined threshold of the clear sky index is 0.9.

16. A method of quantifying the energy losses of a photovoltaic system due to soiling, comprising: providing a computer system with a processor; inputting into the computer processor modeled energy time series data for a photovoltaic system at a location, wherein the modeled energy time series data includes a set of timestamps and a modeled energy; inputting into the computer processor measured energy time series data for the photovoltaic system, wherein the measured energy time series data includes a set of timestamps and actual measured energy data readings; measuring precipitation data, wherein the precipitation data includes a set of data points indicating the precipitation depth at the location of the photovoltaic system and associated precipitation depth timestamps; determining a maximum effective performance ratio time series; determining by the computer processor a soiling loss fraction time series; and determining by the computer processor a soiling losses time series; and determining, with the soiling losses time series, compliance with a contract to clean the photovoltaic system to ensure scheduled cleaning has occurred.

17. A method as in claim 16, wherein the soiling loss fraction time series is the difference between the maximum effective performance ratio time series and a performance ratio time series.

18. A method as in claim 16, wherein determining the maximum effective performance ratio time series is performed by setting an initial value equal to a performance ratio for a given time in a performance ratio time series and iteratively subtracting from a previous value an estimate of typical panel degradation for a time interval.

19. A method as in claim 16, determining whether action can be economically taken to correct losses of the photovoltaic system due to soiling.

* * * * *